United States Patent [19]
Johnson et al.

[11] Patent Number: 5,694,616
[45] Date of Patent: Dec. 2, 1997

[54] METHOD AND SYSTEM FOR PRIORITIZATION OF EMAIL ITEMS BY SELECTIVELY ASSOCIATING PRIORITY ATTRIBUTE WITH AT LEAST ONE AND FEWER THAN ALL OF THE RECIPIENTS

[75] Inventors: William J. Johnson, Flower Mound; Owen W. Weber, Coppell, both of Tex.

[73] Assignee: International Business Machines Corporation, Armonk, N.Y.

[21] Appl. No.: 366,523

[22] Filed: Dec. 30, 1994

[51] Int. Cl.$^6$ .................................................. G06F 13/00
[52] U.S. Cl. ...................... 395/860; 395/200.01
[58] Field of Search .............................. 395/650, 51, 159, 395/200.1, 860; 364/419, 401, 230.1

[56] References Cited

U.S. PATENT DOCUMENTS

| | | | |
|---|---|---|---|
| 5,125,075 | 6/1992 | Goodale et al. | 395/200 |
| 5,144,557 | 9/1992 | Wang et al. | 364/419 |
| 5,278,984 | 1/1994 | Batchelor | 395/650 |
| 5,283,856 | 2/1994 | Gross et al. | 395/51 |
| 5,369,570 | 11/1994 | Parad | 364/401 |
| 5,377,354 | 12/1994 | Scannell et al. | 395/650 |
| 5,479,408 | 12/1995 | Will | 370/94.1 |
| 5,506,952 | 4/1996 | Choy et al. | 395/159 |
| 5,513,126 | 4/1996 | Harkins et al. | 364/514 |
| 5,513,905 | 5/1996 | Bergeron et al. | 379/88 |
| 5,530,861 | 6/1996 | Diamant et al. | 395/650 |
| 5,555,346 | 9/1996 | Gross et al. | 395/51 |

FOREIGN PATENT DOCUMENTS

| | | |
|---|---|---|
| 2-116242 | 4/1990 | Japan . |
| 4-280535 | 10/1992 | Japan . |
| 6-268802 | 9/1994 | Japan . |

OTHER PUBLICATIONS

Miller, M. E., Smartmail Knowledge-Based System For The OfficeVision Desktop, IBM Technical Disclosure Bulletin, Vo. 33, No. 6B, Nov. 1990, p. 414.

Vincent, J. P., Using a Synonym Dictionary To Sort Electronic Mail, IBM Technical Disclosure Bulletin, vol. 34, No. 1, Jun. 1991, p. 487.

Harwood, R. F., et al, Use Of Pre-Processing For Electronic Mail In-Baskets, IBM Technical Disclosure Bulletin, Vo. 35, No. 1B, Jun. 1992, pp. 395-396.

Blades, J. A. et al, Color Coding Of Electronic Messages, Research Disclosure, N341, 09-92.

Johnson, W. J., et al., Method Of Posting Calendar Events In Desired Positions, IBM Technical Disclosure Bulletin, vol. 37, N. 3, 03-94, pp. 549-550.

Johnson, W. J., et al, Chaining Mail Repository Items Over Time, IBM Technical Disclosure Bulletin, vol. 37, No. 2B, Feb. 1994, pp. 113-114.

*Primary Examiner*—Thomas C. Lee
*Assistant Examiner*—Duo Chen
*Attorney, Agent, or Firm*—Norman L. Gundel

[57] ABSTRACT

A method and system are provided for prioritization of the display order of received mail items. In one embodiment, the invention associates a priority sorting attribute with a first email item, sorts an inbasket list of email items by any priority sorting attribute associated with any email item in the inbasket list, said inbasket list including a listing for the first email item, and displays at least a portion of the sorted inbasket list in the sorted order. The priority sorting attribute may be associated with the first email item by either the sender or the receiver of the first email item. A priority sorting attribute may be associated by the sender with some but not all of the intended recipients of the first email item and the priority sorting attribute will then be associated with the first email item only as it is sent to those recipients with whom the priority sorting attribute has been associated.

6 Claims, 3 Drawing Sheets

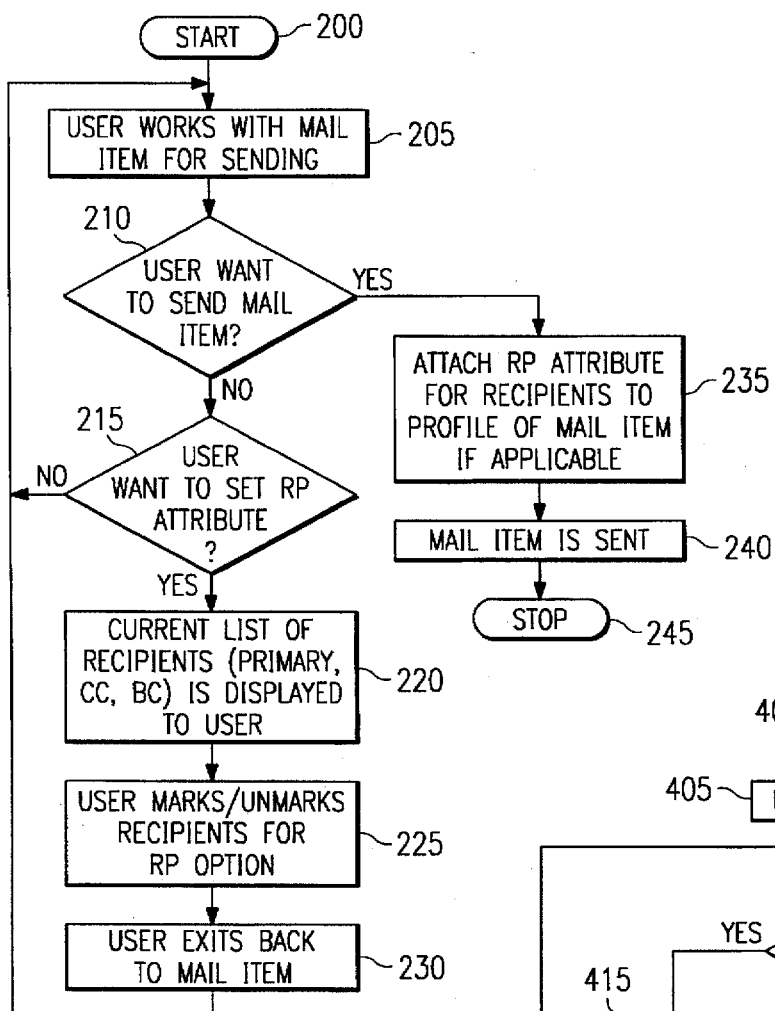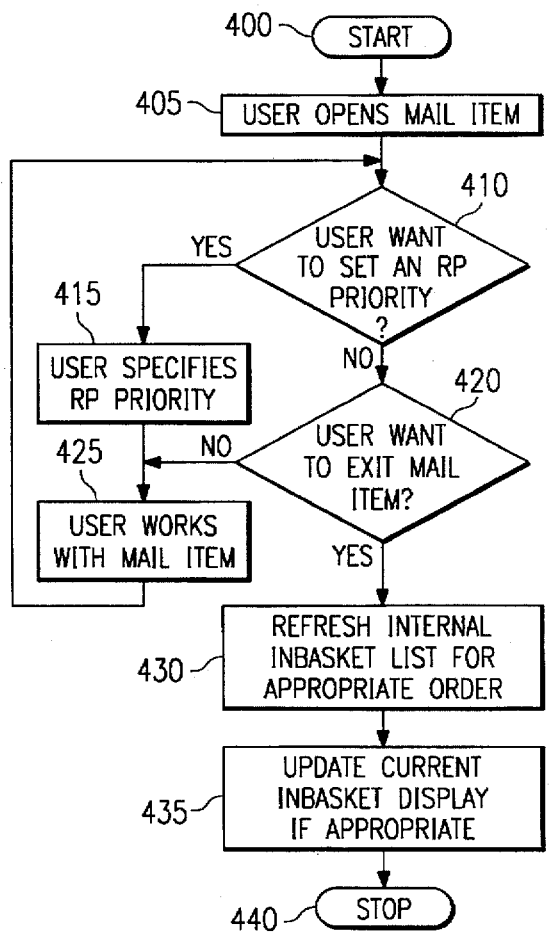

METHOD AND SYSTEM FOR PRIORITIZATION OF EMAIL ITEMS BY SELECTIVELY ASSOCIATING PRIORITY ATTRIBUTE WITH AT LEAST ONE AND FEWER THAN ALL OF THE RECIPIENTS

BACKGROUND OF THE INVENTION

1. Field of the Invention

The present invention relates to electronic mail transmitted across a data processing system and more particularly to the prioritization of the order of display of received electronic mail items to a recipient of the items.

2. Description of the Related Art

Many data processing systems permit the transmission of electronic mail ("email") items between various users of the data processing system. Email items received by a particular user, called a recipient, are placed in an inbasket accessible by the recipient. A list of received email items, called an inbasket list, may be displayed on the data processing system by the recipient, who may select and view individual items from the list.

The inbasket list may display information about each email item, such as the identities of the sender and the recipient, the date and time the item was sent and the contents of a subject field associated with the email item. Any additional contents of the email item may not be displayed in the inbasket list. The items on the list may be ordered by time of receipt, with the most recently received mail item displayed at the top of the list. Display of the inbasket list may require multiple screens, or pages, if enough received email items are contained in the inbasket list.

The data processing system may permit the user who sent the email item to the recipient, called an originator or a sender, to mark the item "urgent". The recipient's inbasket list may display this "urgent" status to the recipient, as by displaying the information about the "urgent" item in a different color or with a different icon. However, later received email items will be displayed above the "urgent" email item on the inbasket list. A large number of later received email items may even push the "urgent" email item onto a subsequent screen or page of the inbasket list, such that the inbasket list entry for the "urgent" email item is not displayed at all on the initial screen of the inbasket list and may, therefore, be overlooked by the recipient.

The recipient may also desire to call his own attention to a particular email item on his inbasket list. However, later arriving email items will also be displayed above the particular item on the recipient's inbasket list. Similarly, a large number of later received email items may push the particular email item of interest off the initially displayed inbasket screen to a subsequent screen of the inbasket list, where it is more easily overlooked by the recipient.

Thus, a data processing system is desired that permits either the sender or the recipient to designate that an important email item shall be displayed above later arriving undesignated email items on the recipient's email list.

SUMMARY OF THE INVENTION

In accordance with the present invention, a method and data processing system are disclosed for prioritization of the display order of received mail items. In one embodiment, the invention associates a priority sorting attribute with a first email item, sorts an inbasket list of email items by any priority sorting attribute associated with any email item in the inbasket list, said inbasket list including a listing for the first email item, and displays at least a portion of the sorted inbasket list in the sorted order. A priority sorting attribute may be associated with the first email item by either the sender or the receiver of the first email item. The priority sorting attribute may be associated by the sender with some but not all of the intended recipients of the first email item and the priority sorting attribute will then be associated with the first email item only as it is sent to those recipients with whom the priority sorting attribute has been associated.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 2 is a high level logic flowchart illustrating the method of the present invention for sending an email item with a recipient priority ("RP") attached;

FIG. 4 is a high level logic flowchart illustrating the method of the present invention for attaching a recipient priority to a previously received email item.

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
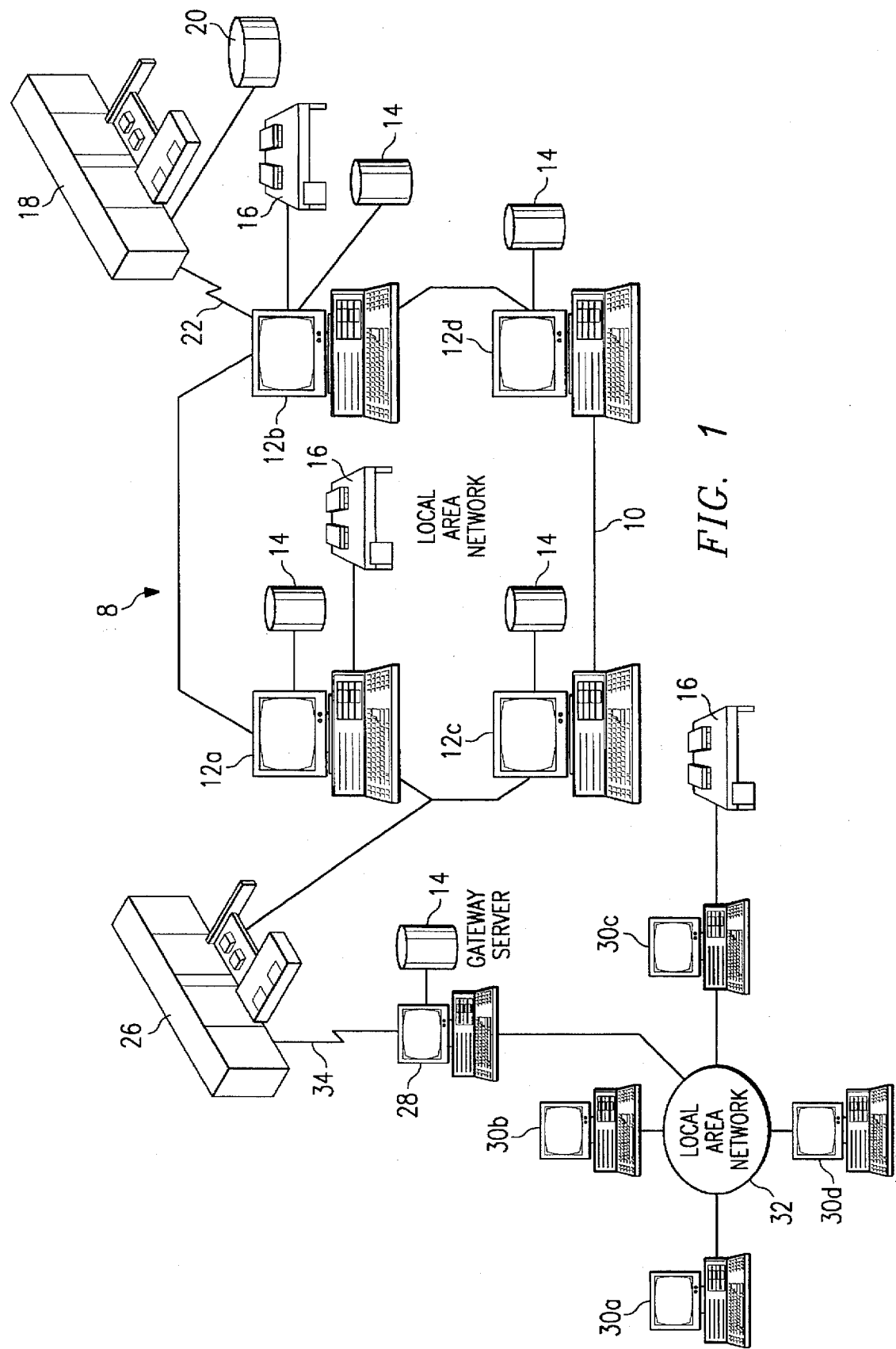
FIG. 1 is a block diagram of an apparatus used in performing the method of a preferred embodiment of the present invention and forming a part of the apparatus of a preferred embodiment of the present invention.

With reference now to the figures, and in particular with reference to FIG. 1, there is shown a pictorial representation of a data processing system 8 which may be used to implement the method and apparatus of the present invention. As may be seen, data processing system 8 may include a plurality of networks, such as local area networks 10 and 32, each of which preferably includes a plurality of individual computers 12a, 12b, 12c, and 12d; and 30a, 30b, 30c, and 30d, respectively. Alternatively, a plurality of intelligent workstations or dumb terminals coupled to a host processor may be utilized for each such network.

Each individual computer may be coupled to a storage device 14 and/or a display printer/output device 16. One or more such storage devices 14 may be utilized to store various documents or software applications, which may be addressed by a user of each individual computer within the data processing system 8.

Still referring to FIG. 1, data processing system 8 may also include multiple mainframe computers, such as mainframe computer 18, which may be preferably coupled to local area network 10 by means of communications link 22. Mainframe computer 18 may also be coupled to a storage device 20 which may serve as remote storage for local area network 10 and may also be coupled by a communications controller 26 and communications link 34 to gateway server 28. Gateway server 28 is preferably an individual computer or intelligent workstation which serves to link local area network 32 to local area network 10.

Still referring to FIG. 1, the data processing system 8 preferably also includes an electronic mail application such as that included in IBM OfficeVision/VM (trademarks of IBM Corp.). The electronic mail application allows an individual user of the data processing system, called a sender or originator, to compose and send an item, or to forward an existing item, to one or more other users, called receivers or recipients. The item may be called an email item, note or mail distribution. The email item is placed in the receiver's electronic inbasket, or mailbox, which is accessible by the receiver on the receiver's workstation. The receiver may receive a notification that a new email item has been received by his inbasket. The receiver may open his inbasket, thereby displaying an inbasket list of email items contained in his inbasket. He may select the newly received item from the inbasket list for viewing, retain the item in his inbasket, store the item in one or more notelogs or other more permanent storage, or delete the item. He may also reply to the sender of the item or forward the item to other users of the data processing system, optionally attaching additional comments of his own.

An item being sent from one user to another will ordinarily be associated with, by containing or including a pointer to, an electronic address of the receiver. The item may also be associated with, by containing or including a pointer to, an electronic address of the sender. The item may also be associated with information such as text or graphics or multimedia information. It may also be associated with information in specialized fields, such as a subject field, fields for other recipients or copy recipients of the item, fields for pointers to other files that may be sent along with the item or that are accessible in some common repository, fields for action dates such as response due dates, reply after dates, reply by dates, expiration dates, and other dates. The item may also be associated with other items or data files, such as an item being replied to, either as text or by use of a pointer to the location of such other items or files.

Referring now to FIG. 2, there is shown a high level logic flowchart illustrating the operations preferred in carrying out the method of the present invention for sending an email item with a recipient priority sorting attribute ("RP") attached. The process begins at process block 200 and proceeds to block 205 in which the sender prepares an email item for sending. This preparation may include the entry or selection of message content, the designation of recipients of the email item, or other conventional tasks of preparation of an email item.

In response to user input, the process proceeds to block 210 for a determination of whether the user input indicates that the sender wants to send the email item. If no, the process proceeds to block 215 for a determination of whether the input indicates that the user wants to set a recipient priority ("RP") attribute for the email item. If no, the process returns to block 205 described above for further preparation of the email item.

Returning to block 215, if the user input indicates that the sender desires to attach an RP attribute to the email item, the process proceeds form block 215 to block 220 and displays a current list of the users designated as recipients of the email item being prepared for sending. This list may include, for example, recipients designated as direct recipients, copy recipients, or blind copy recipients. The process then proceeds to block 225 and permits the sender to select and mark or unmark various recipients for attachment of the RP attribute. Preferably, the sender may mark or unmark individual recipients, multiple selected recipients, groups of recipients or all recipients. Upon completion of the marking or unmarking of recipients, the process proceeds to block 230 and exits back to block 205 described above for further preparation of the email item.

Returning to block 210, if the user input received indicates that the sender wants to send the email item, the process proceeds to block 235 and attaches an RP attribute to each designated recipient of the email item that has been marked for RP in block 225, described above. The process then proceeds to block 240 and sends the email item to the designated recipients. The process then proceeds to block 245 and terminates.

Figure 3:
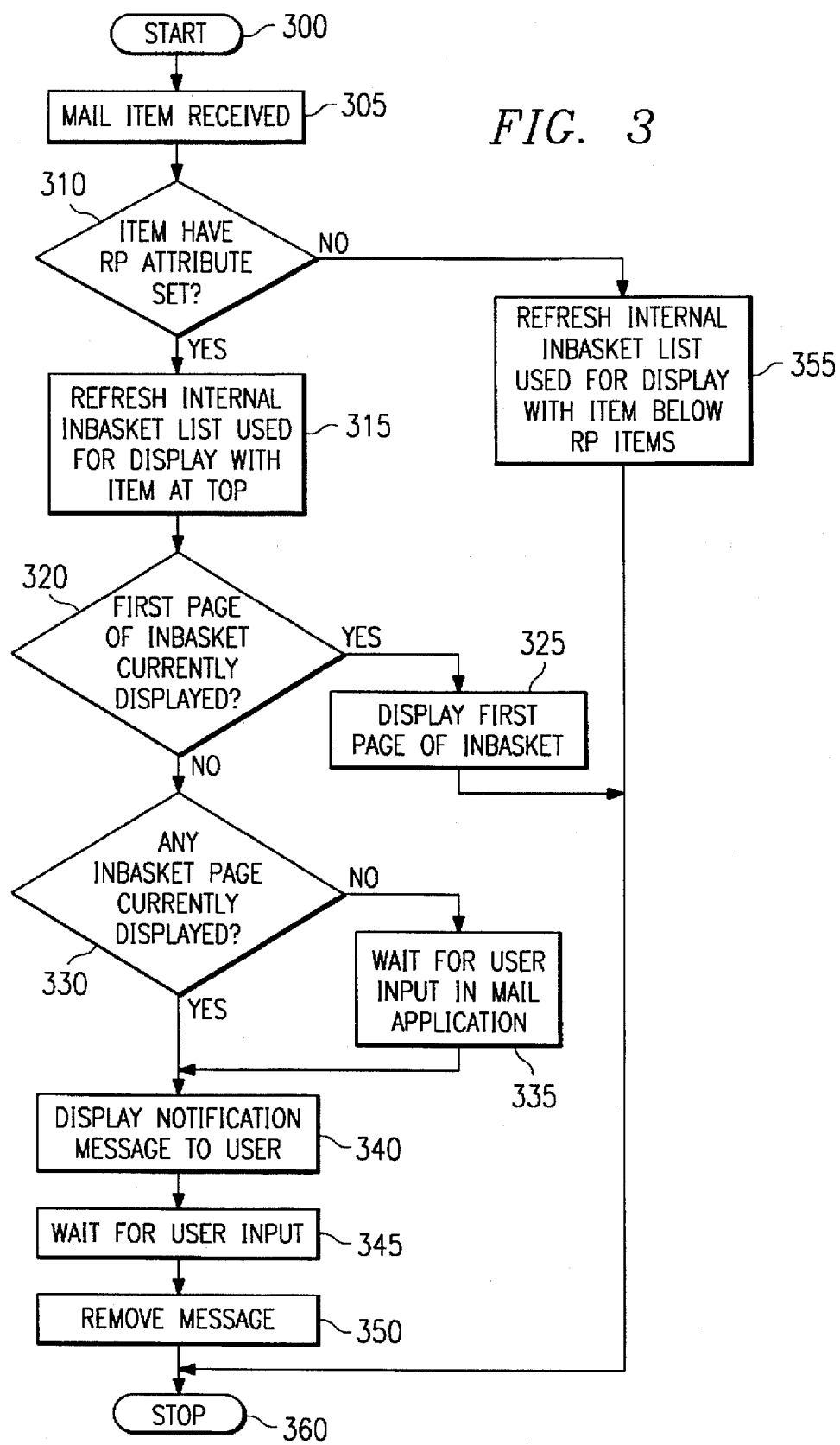
FIG. 3 is a high level logic flowchart illustrating the method of the present invention for receiving an email item with a recipient priority attached.

Turning next to FIG. 3, there is shown a high level logic flowchart illustrating the operations preferred in carrying out the method of the present invention for receiving an email item with a recipient priority attached. The process begins at block 300 and proceeds to block 305 upon receipt of an email item by a user called a receiver. The process then proceeds to block 310 for a determination of whether the newly received email item has an RP attribute set for this recipient. If yes, the process proceeds to block 315 and refreshes the internal inbasket list with the newly received email item bearing the RP attribute, placing the newly received item at the top of the list. The internal inbasket list is the list of all received email items of the recipient. It is used by the data processing system to generate and display individual screens or pages of the inbasket list which may be displayed to the user from time to time.

The process next proceeds to block 320 for a determination of whether the first page of the inbasket list is currently displayed. If so, the process proceeds to block 325 and refreshes the display of the first page of the inbasket list, displaying the newly received RP email item at the top of the displayed first page of the list. The process then proceeds to block 360 and terminates.

Returning to block 320, if the process determines that the first page of the inbasket list is not currently displayed, the process proceeds to block 330 for a determination of whether any page of the inbasket list is currently being displayed. If not, the process proceeds to block 335 and waits for a user input to display the inbasket. When such user input is received, the process proceeds to block 340. Returning to block 330, if the process determines that an inbasket page is currently being displayed, the process also proceeds to block 340.

In block 340, the process displays a notification advising the recipient that an email item bearing an RP attribute has been received. The process then proceeds to block 345 and awaits user input. Upon receipt of the user input, the process proceeds to block 350 and removes the message displayed in block 340. The process then proceeds to block 360 and terminates.

Returning to block 310, if, upon receipt of an email item, the process determines that the email item does not bear an RP attribute, the process proceeds from block 310 to block 355 and refreshes the internal inbasket list by inserting the newly received email item below any RP items in the inbasket list but above all non-RP items in the inbasket list. The process then proceeds to block 360 and terminates, allowing conventional processing of the newly received email item.

One should appreciate that blocks 315 and 355 demonstrate an email item is inserted into one of a plurality of implemented candidate positions within the email inbasket list. An item is not simply added to the top or bottom of the inbasket list.

Turning next to FIG. 4, there is shown a high level logic flowchart illustrating the operations preferred in carrying out the method of the present invention for attaching a recipient priority to a previously received email item. The process begins at block 400 and proceeds to block 405 in which the recipient opens an email item. Upon receipt of a user input, the process then proceeds to block 410 for a determination of whether the input indicates that the user wants to attach an RP attribute to the open email item. If yes, the process proceeds to block 415 and attaches an RP attribute to the open email item. The process then proceeds to block 425 and permits further, conventional manipulation of the open email item by the user. Upon receipt of user input, the process returns to block 410.

Returning to block 410, if the process determines that the user input does not indicate a desire to attach an RP attribute, the process proceeds to block 420 for a determination of whether the user input indicates a desire to exit from the email item. If no, the process proceeds to block 425, described above. If yes, the process proceeds from block 420 to block 430.

In block 430, the process refreshes the internal inbasket list. If an RP attribute has been attached to the open email item, the process places the item at the top of the internal inbasket list among any other email items bearing an RP attribute, ordering all of the email items bearing RP attributes in order by the time each was received by the sender, placing all RP-bearing email items in the inbasket list above the first email item without an RP attribute. The process then proceeds to block 435 and refreshes the current inbasket list display if the contents of the portion of the inbasket list being displayed was changed by the refresh of block 430. The process then proceeds to block 440 and terminates.

While the invention has been particularly shown and described with reference to a preferred embodiment and process, it will be understood that various changes in form and detail may be made therein without departing from the spirit and scope of the invention.

What is claimed is:

1. A method, performed in a data processing system, for displaying email items, the method comprising the computer implemented steps of:

the sender of a first email item having multiple individual recipients associated therewith associating a priority sorting attribute with at least one and fewer than all of the individual recipient of the first email item;

sending the first email item to said multiple individual recipients associated with the first email item;

sending the priority sorting attribute with the first email item only to those individual recipients of the first email item with whom the priority sorting attribute has been associated;

sorting an inbasket list of email items by any priority sorting attribute associated with any email item listed in the inbasket list, said inbasket list including a listing for the first email item, wherein at least two and fewer than all inbasket items in said inbasket have priority sorting attributes; and displaying at least a portion of the sorted inbasket list in sorted order.

2. The method of claim 1, wherein a priority sorting attribute is not sent to those individual recipients of the first email item with whom the priority sorting attribute is not associated.

3. A data processing system for displaying email items, comprising:

means for the sender of a first email item having multiple individual recipients associated therewith to associate a priority sorting attribute with at least one and fewer than all of the individual recipient of the first email item;

means for sending the first email item to said multiple individual recipients associated with the first email item;

means for sending the priority sorting attribute with the first email item only to those individual recipients of the first email item with whom the priority sorting attribute has been associated;

means for sorting an inbasket list of email items by any priority sorting attribute associated with any email item listed in the inbasket list, said inbasket list including a listing for the first email item, wherein at least two and fewer than all inbasket items in said inbasket have priority sorting attributes; and means for displaying at least a portion of the sorted inbasket list in sorted order.

4. The data processing system of claim 3, wherein a priority sorting attribute is not sent to those individual recipients of the first email item with whom the priority sorting attribute is not associated.

5. A computer program product for displaying email items, the computer program product comprising:

a computer usable medium having computer readable program code embodied in said medium, said computer program product including:

computer readable program code means for the sender of a first email item having multiple individual recipients associated therewith to associate a priority sorting attribute with at least one and fewer than all of the individual recipient of the first email item;

computer readable program code means for sending the first email item to said multiple individual recipients associated with the first email item;

computer readable program code means for sending the priority sorting attribute with the first email item only to those individual recipients of the first email item with whom the priority sorting attribute has been associated;

computer readable program code means for sorting an inbasket list of email items by any priority sorting attribute associated with any email item listed in the inbasket list, said inbasket list including a listing for the first email item, wherein at least two and fewer than all inbasket items in said inbasket have priority sorting attributes; and computer readable program code means for displaying at least a portion of the sorted inbasket list in sorted order.

6. The computer program product of claim 5, wherein a priority sorting attribute is not sent to those individual recipients of the first email item with whom the priority sorting attribute is not associated.

* * * * *